United States Patent

Yuhi et al.

[11] Patent Number: 5,714,810
[45] Date of Patent: Feb. 3, 1998

[54] MINIATURE MOTOR

[75] Inventors: Toshiya Yuhi; Minako Sakamaki, both of Chiba-ken, Japan

[73] Assignee: Mabuchi Motor Co., Ltd., Chiba-ken, Japan

[21] Appl. No.: 664,024

[22] Filed: May 28, 1996

[30] Foreign Application Priority Data

May 31, 1995 [JP] Japan .................. 7-133081

[51] Int. Cl.$^6$ ........................ H02K 7/00; H02K 9/00
[52] U.S. Cl. .................. 310/40 MM; 310/62; 310/63
[58] Field of Search .................. 310/40 MM, 62, 310/63, 254, 64, 227, 91, 233

[56] References Cited

U.S. PATENT DOCUMENTS

| | | | |
|---|---|---|---|
| 4,092,556 | 5/1978 | Mabuchi | 310/63 |
| 4,467,231 | 8/1984 | Biglino | 310/154 |
| 4,588,911 | 5/1986 | Gold | 310/62 |
| 4,682,065 | 7/1987 | English et al. | 310/90 |
| 4,896,065 | 1/1990 | Tsuyama | 310/40 MM |
| 5,053,657 | 10/1991 | Ikegami et al. | 310/63 |
| 5,296,775 | 3/1994 | Cronin et al. | 310/309 |

*Primary Examiner*—Clayton E. LaBalle
*Assistant Examiner*—Michael J. Wallace, Jr.
*Attorney, Agent, or Firm*—McGlew and Tuttle

[57] ABSTRACT

A miniature motor comprising a housing formed into a bottomed hollow tubular shape and having a permanent magnet fixedly fitted to the inner circumferential surface thereof, a rotor facing the permanent magnet and comprising an armature iron core having a coil wound thereon and a commutator, an end plate fitted to an open end of the housing and having brushes coming in sliding contact with the commutator and input terminals electrically connected to the brushes, and a cooling fan provided between the armature iron core of the rotor and the commutator; the rotor being rotatably supported by bearings provided on the bottom of the housing and the end plate, in which an integral cooling fan is formed by providing a plurality of fins at circumferentially equal intervals between first and second fan rings fitted to the ends of the commutator and the armature iron core, respectively, and a plurality of bosses are provided on the end face of the second fan ring.

8 Claims, 11 Drawing Sheets

FIG. I
(PRIOR ART)

MINIATURE MOTOR

BACKGROUND OF THE INVENTION AND RELATED ART STATEMENT

This invention relates generally to a miniature motor incorporating a cooling fan, and more particularly to a miniature motor of such a construction that the cooling fan can be used in common for rotors having different numbers of poles.

In miniature motors of a type requiring high power as used in power drills, cooling fans have been incorporate for the purpose of self cooling. FIG. 1 is a longitudinal sectional view of the essential part of a prior-art miniature motor incorporating a cooling fan, to which this invention is applied. In FIG. 1, numeral 1 denotes a housing made of a metallic material such as mild steel, formed into a bottomed hollow tubular shape and having a permanent magnet 3 of an arc-segment shape, for example, fixedly fitted to the inner circumferential surface thereof.

The housing 1 supports a rotor 8 comprising an armature iron core 9 having a coil 10 wound thereon, and a commutator 12. Numeral 14 denotes a brush made of an electrically conductive, elastic material and provided on an end plate, together with an input terminal (not shown) electrically connected to the brush 14, in such a manner as to come in sliding contact with the commutator 12.

Numeral 11 denotes a bearing. The bearings 14 are fixedly fitted to the bottom of the housing 1 and the central part of the end plate 4, respectively, to rotatably support the rotor 8. Numerals 5, 6 and 7 denote vent holes provided at appropriate locations on the housing 1 and the end plate 4. Numeral 13 denotes a cooling fan provided between the armature iron core 9 of the rotor 8 and the commutator 12 and formed in such a manner as to be rotatable together with the rotor 8.

With the aforementioned construction, as current is fed from the input terminals to the coil 10 via the commutator 12 constituting the rotor 8 and the brushes 14, rotating force is imparted to the armature iron core 9 placed in a magnetic field formed by the permanent magnet 3 fixedly fitted to the inner circumferential surface of the housing 1, causing the rotor 8 to rotate. Thus, external equipment (not shown) can be driven via the rotating shaft 15.

As the cooling fan 13 is caused to rotate together with the rotation of the rotor 8, air is introduced from the vent holes 5 and 7, and discharged from the vent hole 6, for example. This allows the coil 10 and other component members to cool, preventing the temperature rise of the miniature motor.

FIG. 2 is a front view of the essential part of the rotor 8 shown in FIG. 1. Like parts are indicated by like numerals given in FIG. 1. In FIG. 2, the cooling fan 13 comprises a ring 21 formed in such a manner as to be fitted to the end of the commutator 12, a plurality of fins 22 formed integral with the ring 21 and provided at circumferentially equal intervals, and legs 23 formed integral with the fins 22 in such a manner as to extend along the axial direction of the rotor 8.

The cooling fan 13 of the aforementioned construction is fixedly fitted to the rotor 8 with adhesive in such a manner that the cooling fan 13 is fitted to the outer periphery of terminals 24 of the commutator 12 after the ends of the coil 10 have been connected to the terminals 24 by spot welding, and the end faces of the legs 23 are kept into contact with, or slightly apart from, the end face of the armature iron core 9.

FIG. 3 is a side view illustrating another example of a rotor having a prior-art cooling fan. In FIG. 3, a cooling fan 13 is formed by providing a plurality of fins 34 integrally between a first fan ring 32 and a second fan ring 33, both provided at a certain interval in the axial direction. The inner circumferential surface of the first fan ring 32 is formed into a polygonal tubular shape (a dodecaonal tubular shape in FIG. 3) corresponding to the number of poles of a commutator 12 and brought into contact with the outer circumferential surfaces of terminals 24 of the commutator 12. The outer end face of the second fan ring 33 is brought into contact with the end face of an armature iron core (not shown).

FIG. 4 is a longitudinal sectional view illustrating still another example of a prior-art miniature motor, and FIG. 5 is an enlarged perspective view illustrating the cooling fan shown in FIG. 4. (Refer to Japanese Published Unexamined Utility Model Application No. Sho-49(1974)-129004.) In FIGS. 4 and 5, numeral 25 denotes a stator, 26 a rotor, and 27 a cooling fan, respectively. The cooling fan 27 is formed by providing a plurality of fins 29 on the outer surface of a tubular body 28 formed into a hollow truncated conical shape having supporting legs 30 on the larger diameter end face thereof. As shown in FIG. 4, the cooling fan 27 is fixedly fitted to the rotor 26 with adhesive or varnish, etc. after the supporting legs 30 have been inserted into the slots of the rotor 26.

FIGS. 6 and 7 are plan views illustrating other examples of prior-art cooling fans. In FIGS. 6 and 7, the cooling fan 13 is formed by providing a plurality of fins 34 integrally between a first and second fan rings 32 and 33 provided at a certain interval in the axial direction, similarly to that shown in FIG. 3. Numeral 35 denotes positioning projections provided on the inner circumferential surface of the first fan ring 32 at circumferentially equal intervals corresponding to the number of poles of a commutator (not shown). FIG. 6 shows a cooling fan for a 3-pole motor, and FIG. 7 that for a 5-pole motor.

In the cooling fan 13 having such a construction as shown in FIG. 2, however, the fin 22 that is connected to the ring 21 only at one end thereof tends to be deformed or damaged in a state where the cooling fan 13 has not been fitted to the rotor 8. The cooling fan 13 of the aforementioned construction is usually molded using a resin material and has a shape lacking in rigidity. As a result, the cooling fan 13 tends to be deformed even immediately after molded, and is often involved with variability in dimensional accuracy. If polyphenylene sulfide (PPS), for example, is used as the resin material to maintain rigidity, the intended rigidity cannot be maintained unless mold temperature is kept at approx. 140° C. during molding. This could result in troublesome molding operations.

In the arrangement of the cooling fan 13 shown in FIG. 3, alignment of the cooling fan 13 with the rotor 8 is affected by the state of the spot-welded outer periphery of the terminals 24 of the commutator 12, to which the ends of the coil 10 have been connected. That is, the thickness and hardness of the terminals 24 tend to vary due to a number of adversely affecting factors, such as the shape of the spot-welding electrode, the position of contact surfaces, spot-welding conditions (current value, a force to collapse the terminals 24, etc.).

Consequently, if the outside diameter of the terminals 24 of the commutator, for example, is formed smaller than a predetermined value due to the aforementioned conditions, the axial center of the cooling fan 13 may become remarkably offset with respect to the axial center of the commutator 12. This could upset the balance of the rotor 8, leading to increased mechanical noise in the miniature motor. This could also Give an additional load to the bearings, accelerating the wear of the bearings or making the contact between the commutator 12 and the brushes unstable. All this leads to lowered motor performance and reduced motor service life.

The cooling fan 27 shown in FIGS. 4 and 5 has an advantage that the end portion of the rotor 26 is closed by a tubular body 28, leading to increased rigidity. This arrangement, however, not only has a low cooling effect but also tends to accumulate heat from the rotor 26.

Furthermore, the cooling fan 13 of the construction shown in FIGS. 6 and 7 has a high cooling effect because hollow open space is formed between the fins 34 and 34. The cooling fan 13 of this construction has also higher rigidity than the cooling fan shown in FIG. 2 because both ends of the fin 34 are supported by the first and second fan rings 32 and 33. With the cooling fan of this construction, however, a large number of positioning projections 35 have to be prepared in accordance with different specifications of the miniature motor because the positioning projections as many as the number of poles of the commutator are required. This could lead to an increase in the manufacturing cost of metal molds and troublesome parts management.

All of the miniature motors of the aforementioned constructions have a problem in that the mounting position of the cooling fan on the rotor in the axial direction is limited. This problem will be described in the following.

FIGS. 8A and 8B are a front view and a right-hand side view illustrating an example of a prior-art 3-pole rotor, FIGS. 9A and 9B are a front view and a right-hand side view illustrating an example of a prior-art 5-pole rotor, and FIGS. 10A and 10B are a front view and a right-hand side view illustrating an example of a prior-art 12-pole rotor, respectively. Like parts are indicated by like numerals shown in FIGS. 2 and 3.

As can be seen in FIGS. 8A through 10B, when dimensions $L_1$, $L_2$ and $L_3$ from the end face of an armature iron core 9 to the end portion of coil 10 are compared, $L_1 < L_2 < L_3$. That is, whereas the coil 10 is wound in a 1-pole winding pattern in a 3-pole rotor 8 shown in FIGS. 8A and 8B, the coil 10 is wound in a 2-pole winding pattern in a 5-pole rotor 8 shown in FIGS. 9A and 9B, thereby forming an overlapped portion of the coil 10 at the end portion of the rotor 8. In a 12-pole rotor 8 shown in FIGS. 10A and 10B, the coil 10 is wound in a 5-pole winding pattern, further increasing the overlapped portion of the coil 10 formed at the end portion of the rotor 8.

In the 3-pole rotor shown in FIGS. 8A and 8B where the dimension $L_1$ is small, the distance between the end faces of the commutator 12 and the armature iron core 9 is reduced to increase the axially laminated size of the armature iron core 9 to improve motor performance. Even in a miniature motor using a housing (not shown. Refer to numeral 1 in FIG. 1.) of the same size, a 3-pole or 5-pole rotor, for example, may be used depending on applications. This could lead to different distances between the end faces of the armature iron core 9 and the commutator 12, and therefore the different axial dimensions of the cooling fan to be installed. This is another reason why various types of cooling fans have to be prepared, in addition to the aforementioned reasons. This also poses an obstacle in reducing the manufacturing cost of miniature motors.

SUMMARY OF THE INVENTION

This invention is intended to overcome problems inherent in the prior art, and it is an object of this invention to provide a miniature motor having such a construction that the same type of cooling fan can be used in common for rotors having different numbers of poles.

To accomplish these objectives, this invention employs a technical means in which an integral cooling fan is formed by providing a plurality of fins at circumferentially equal intervals between first and second fan rings fitted to the ends of the commutator and the armature iron core, respectively, and a plurality of bosses are provided on the end face of the second fan ring in a miniature motor comprising a housing formed into a bottomed hollow tubular shape and having a permanent magnet fitted to the inner circumferential surface thereof, a rotor facing the permanent magnet and comprising an armature iron core having a coil wound thereon and a commutator, an end plate fitted to an open end of the housing and having brushes coming in sliding contact with the commutator and input terminals electrically connected to the brushes, and a cooling fan provided between the armature iron core of the rotor and the commutator; the rotor being rotatably supported by bearings provided on the bottom of the housing and the end plate.

In this invention, more than three positioning projections can be provided on the inner circumferential surface of the first fan ring, and two of these projections can be disposed at both ends in the circumferential direction of any one terminal provided on the outer periphery of the commutator, other projections are provided at locations within a particular angular range with the center of the aforementioned two projections as the reference in such a manner as to prevent interference with terminals of the commutator, so that all the central angles of the adjoining projections become less than 180°.

In this invention, a plurality of bosses can be provided in such a manner as to be inserted into slots formed on the armature iron core, and the end face of the second fan ring can be brought into contact with the end face of the armature iron core.

In this invention, the end faces of a plurality of bosses can be formed on a plane parallel with a plane orthogonally intersecting the axial line of the rotor, and the end faces of the bosses can be brought into contact with the end face of the armature iron core.

With the aforementioned construction, the mounting position of the cooling fan can be selected in two ways; either by inserting a plurality of bosses provided on the end face of the second fan ring into slots provided on the armature iron core, or bringing the bosses in contact with the end face of the armature iron core, so that the same cooling fan can be used in common for rotors of different numbers of poles.

Furthermore, since the cooling fan can be positioned in the circumferential direction and in terms of concentricity using the positioning projections provided on the inner circumferential surface of the first fan ring, no interference is caused with commutators having different numbers of poles, thus making it possible to use the same cooling fan for such commutators.

DETAILED DESCRIPTION OF THE EMBODIMENTS

Figure 11:
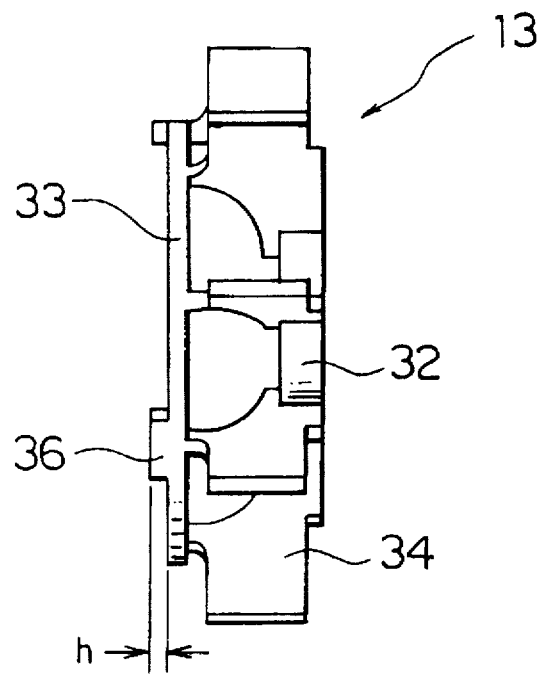
FIGS. 11 and 12 are a front view and right-hand side view showing an example of a cooling fan embodying this invention.
Figure 12:
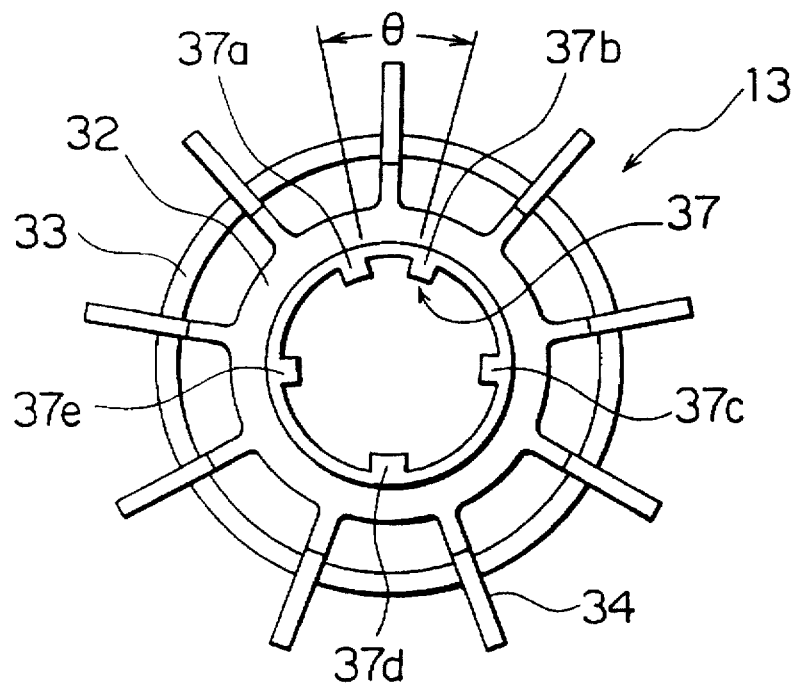

FIGS. 11 and 12 are a front view and a right-hand side view showing an example of a cooling fan in an embodiment of this invention. Like parts are indicated by like numerals shown in FIGS. 6 and 7. In FIGS. 11 and 12, numeral 36 denotes a boss; a plurality of bosses 36 provided on the end face of the second fan ring 33, and the end face of the boss 36 being formed into a plane parallel with a plane orthogonally intersecting the axial line of the cooling fan 13.

Figure 6:
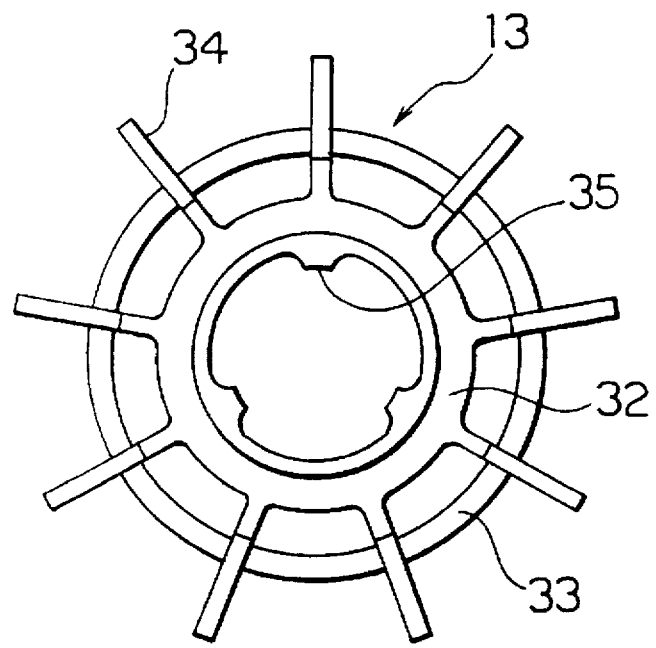
FIGS. 6 and 7 are plan views showing other examples of prior-art cooling fans.
Figure 7:
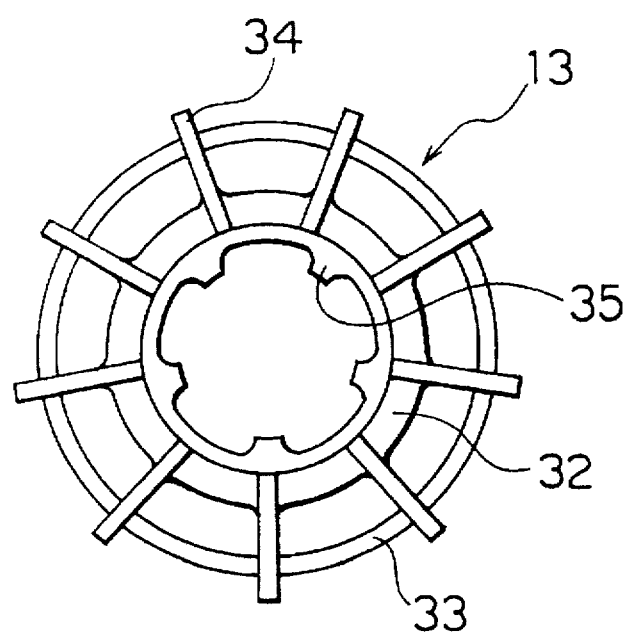

With the aforementioned construction, the cooling effect can be enhanced, the rigidity of the cooling fan 13 can also be increased, and deformation and damage during molding and handling can be prevented, as in the case of the cooling fans shown in FIGS. 6 and 7. In addition, polyamide 46 (PA46) can be used as the material of the cooling fan, which enables molding at low mold temperatures (80° C.) during molding. As a result, workability can be improved substantially because molds can be heated by hot water.

Figure 8A:
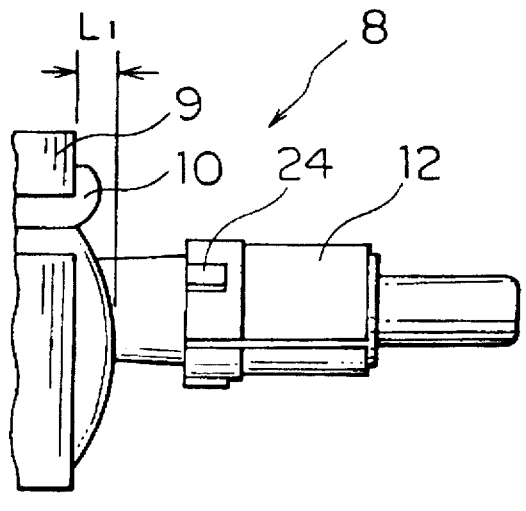
FIGS. 8A and 8B are a front view and a right-hand side view showing an example of a prior-art 3-pole rotor.
Figure 8B:
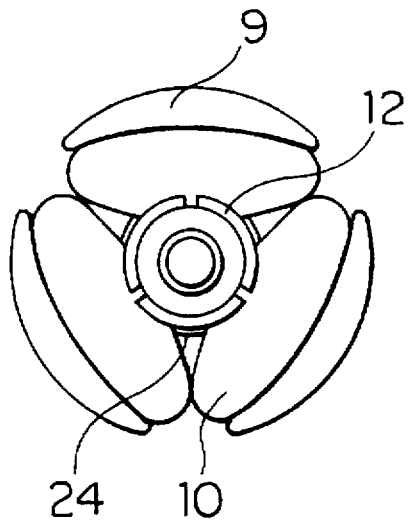
Figure 9A:
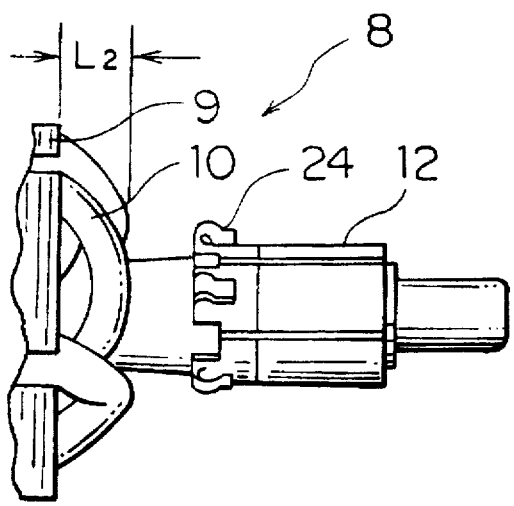
FIGS. 9A and 9B are a front view and a right-hand side view showing an example of a prior-art 5-pole rotor.
Figure 9B:
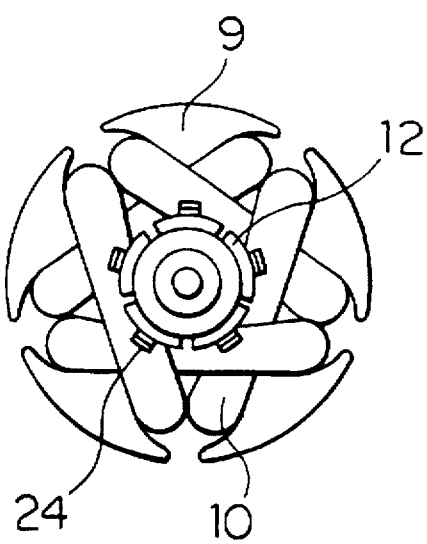

Next, the size and the installation method of the boss 36 will be described in the following. Assume that a cooling fan 13 is used in common for two types of rotors A and B having different numbers of poles (the number of poles is larger with the rotor A). Then, the height h of the boss 36, the width thereof in the circumferential direction, the number of bosses installed, and the central angle of installation are:

Height h=$L_A$-$L_B$
where $L_A$ and $L_B$ are dimensions from the end face of the armature iron core to the end portion of the coil (refer to $L_1$ and $L_2$ in FIGS. 8A and 9A.)

Width in the circumferential direction: Length of boss 36 that can be inserted into a slot provided on the armature iron core constituting the rotor B No. of bosses provided: Same as the number of poles of the rotor B Central angle between bosses: 360° /(no. of poles of rotor B)

With the aforementioned construction, when the side of the cooling fan 13 on which the bosses 36 are provided is fitted to the end face of the armature iron core in the rotor B, the bosses 36 are easily inserted into the slots provided on the armature iron core, bringing the end face of the second fan ring 33 into contact with the end face of the armature iron core. In the rotor A, on the other hand, the end faces of the bosses 36 are brought into contact with the end face of the armature iron core. Consequently, the cooling fan 13 can be positioned with either the rotor A or the rotor B in the axial direction.

In FIG. 12, numeral 37 denotes a positioning projection; more than three positioning projections 37 provided on the inner circumferential surface of the first fan ring 32. Out of these projections 37, projections 37a and 37b are positioned at both ends sides in the circumferential direction of any one terminal provided on the outer periphery of a commutator (not shown). Next, other projections 37c, 37d and 37e are provided at such locations as to prevent interference with terminals provided on the commutator, as will be described later. The outside diameter of the projections 37a–37e is formed into essentially the same as the outside diameter of the commutator.

With the aforementioned construction, when the cooling fan 13 is mounted on a rotor (not shown), alignment of the rotor and the cooling fan 13 can be maintained because the inner circumferential surfaces of the projections 37a–37e come in contact with the outer circumferential surface of the commutator which has been machined with high precision.

Now, the installation methods of the bosses 36 and the projections 37 will be described in detail for the cooling fan 13 that can be used in common for 3-pole and 5-pole rotors.

The height h of the boss 36 is; h=$L_2$-$L_1$ from FIGS. 8A and 9A, the number of bosses 36 provided is three, and the central angle between the bosses 36 is 120°.

The terminals provided on the outer periphery of the commutator are disposed at positions of a×360°/(no. of poles) (where a is a continuous positive integer from 1 to no. of poles), in terms of central angle, with respect to the center of the projections 37a and 37b in FIG. 12 as the reference. Furthermore, the projections 37 can be disposed at positions other than (positions of the commutator terminals ±θ/2), taking into consideration the central angle θ of the commutator terminal shown in FIG. 12.

Consequently, the angular positions of the commutator terminals are 120°, 240° and 360° for the 3-pole rotor, and 72°, 144°, 216°, 288° and 360° for the 5-pole rotor. The positions of the projections 37 are therefore determined from these central angles allowing for the central angle θ. Thus, the angular positions at which the projections 37 can be set are (1) 0°–72°, (2) 72°–120°, (3) 120°–144°, (4) 144°–216°, (5) 216°–240°, (6) 240°–288°, and (7) 288°–360°.

Taking into account the aforementioned central angle θ, however, it would be impossible to install the projections 37 at the positions (3) and (5). Next, the positions (1) and (7) are set in the neighborhood of 0° and 360°, respectively, because these positions should be disposed at both ends in the circumferential direction of a commutator terminal to serve as the reference in the circumferential direction. As to the projection to be disposed at the position (4), when the projections to be disposed at the positions (1) and (7) are not disposed at both ends in the circumferential direction of a commutator terminal, the width in the circumferential direction of the projection 37 to be disposed at the position (4) is set in such a manner as to interfere with the commutator terminal. This arrangement can prevent the cooling fan 13 from being incorporated at a wrong position. In this way, the positions 37a and 37b are disposed at the positions (1) and (7), and the projections 37e, 37d and 37c are disposed at the positions (2), (4) and (6), respectively, as shown in FIG. 12.

Figure 1:
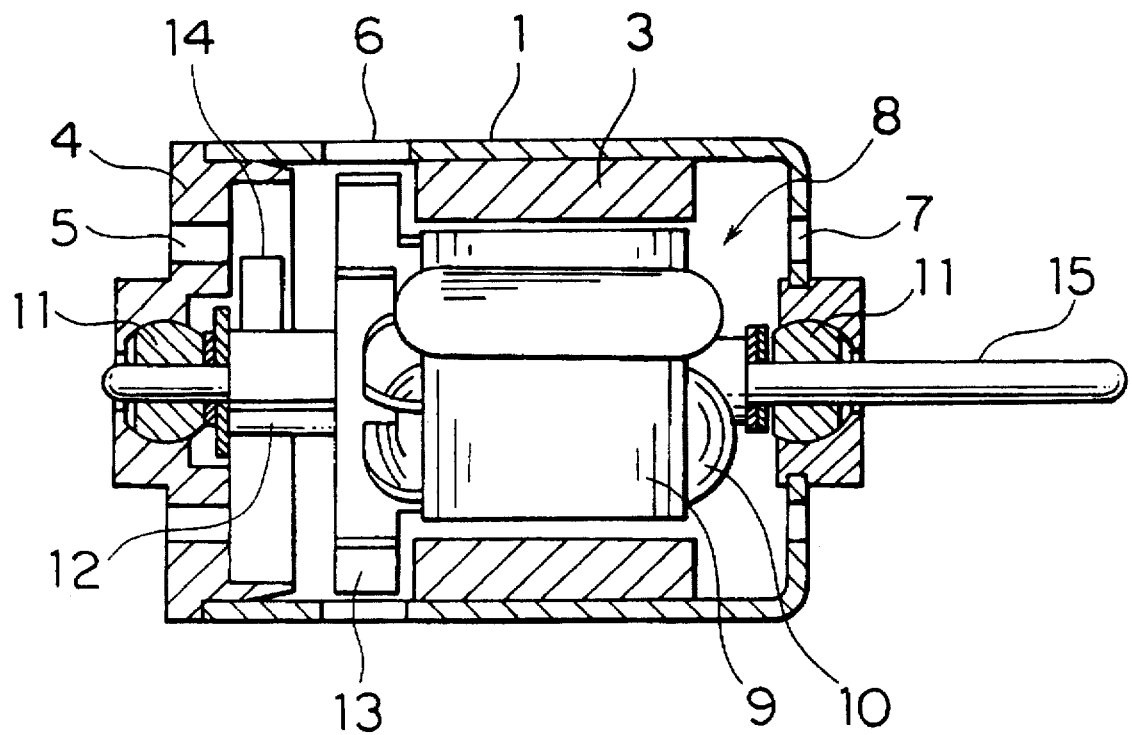
FIG. 1 is a longitudinal sectional view of a miniature motor incorporating a prior-art cooling fan.
Figure 2:
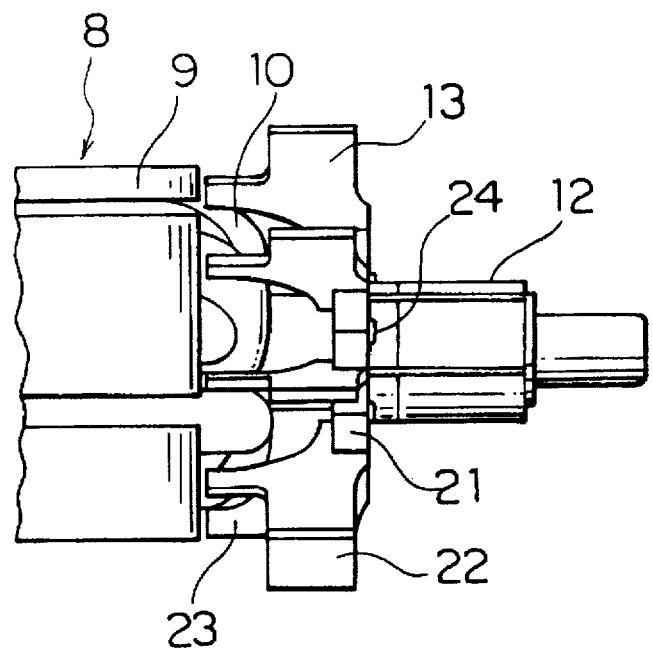
FIG. 2 is a front view of the rotor 8 in FIG. 1.
Figure 3:
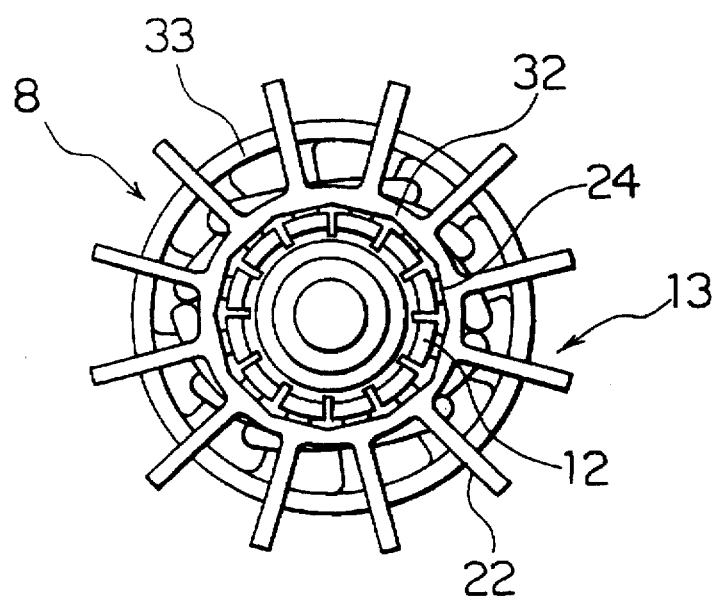
FIG. 3 is a side view showing another example of a rotor having a prior-art cooling fan.
Figure 4:
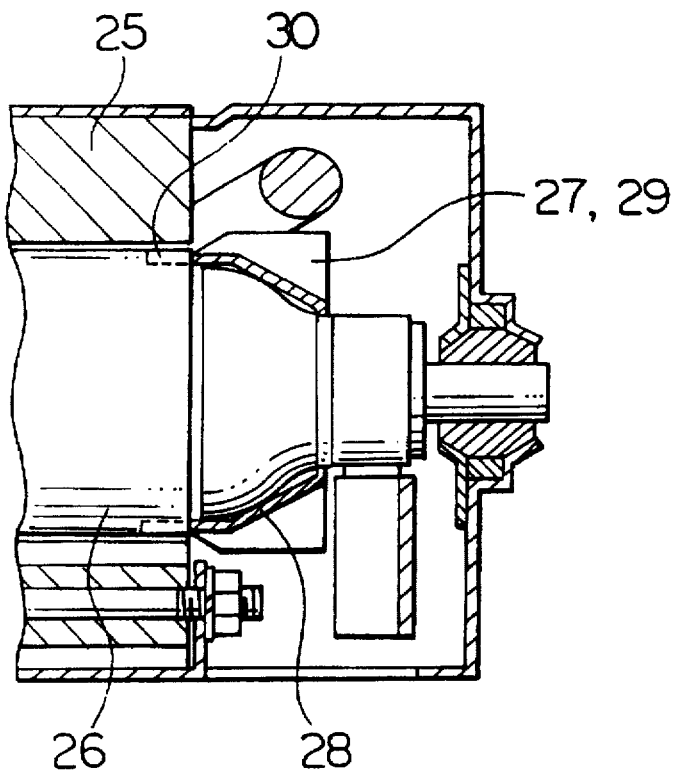
FIG. 4 is a longitudinal sectional view showing another example of a prior-art miniature motor.
Figure 5:
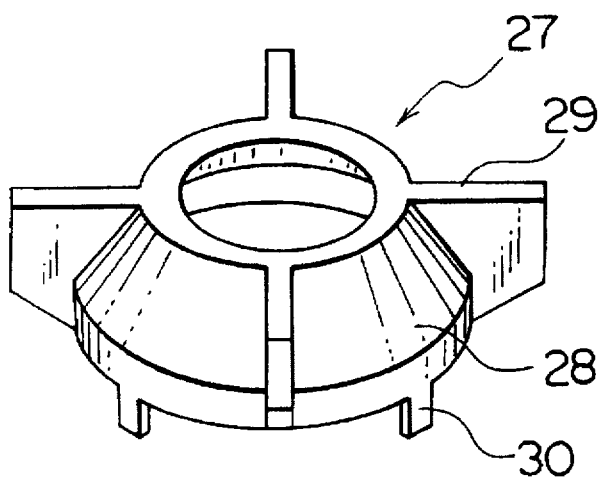
FIG. 5 is an enlarged perspective view showing the cooling fan in FIG. 4.
Figure 13:
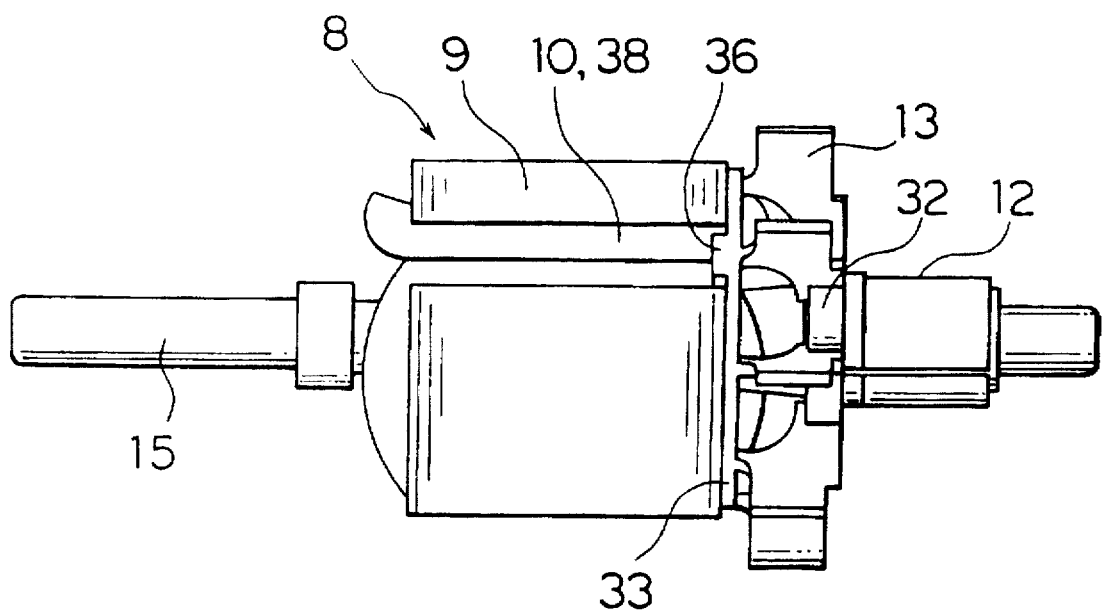
FIGS. 13 and 14 are a front view and a right-hand side view showing an example of a 3-pole rotor on which a cooling fan embodying this invention is mounted.
Figure 14:
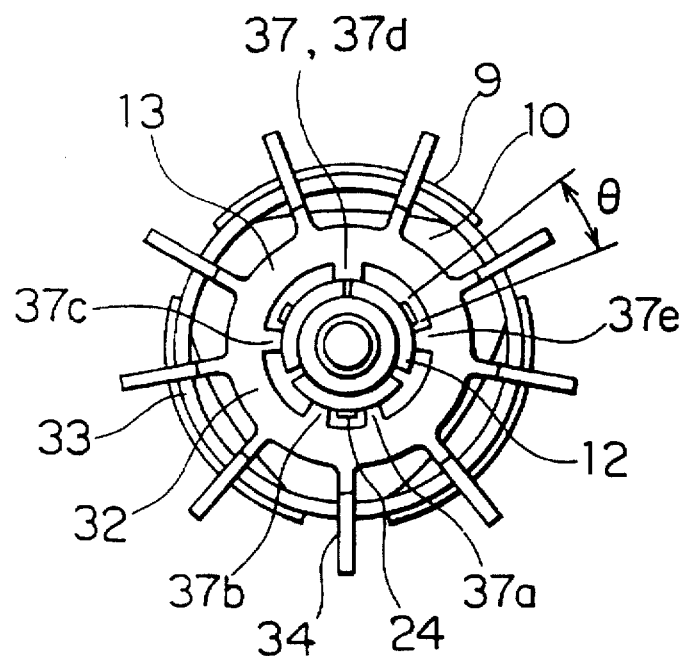

FIGS. 13 and 14 are a front view and a right-hand side view of a 3-pole rotor 8 having a cooling fan 13 embodying this invention. Like parts are indicated by like numerals shown in FIGS. 1 and 2. In FIGS. 13 and 14, the cooling fan 13 is positioned in the axial direction as the end face of the second fan ring 33 is brought into contact with the end face of the armature iron core 9 by inserting a boss 36 provided on the second fan ring 33 of the cooling fan 13 into a slot 38 provided on the armature iron core 9.

The cooling fan 13 is positioned in the concentrical and circumferential directions since the inner circumferential surface of the projections 37a–37e provided on the inner circumferential surface of the first fan ring 32 comes in contact with the outer circumferential surface of the commutator 12, and the projections 37a and 37b are disposed at both ends in the circumferential direction of any one terminal 24, and because the other projections 37c–37e do not interfere with the terminal 24. The cooling fan 13 can be tightly secured to the rotor 8 by applying adhesive to the inside of the first fan ring 32.

Figure 15A:
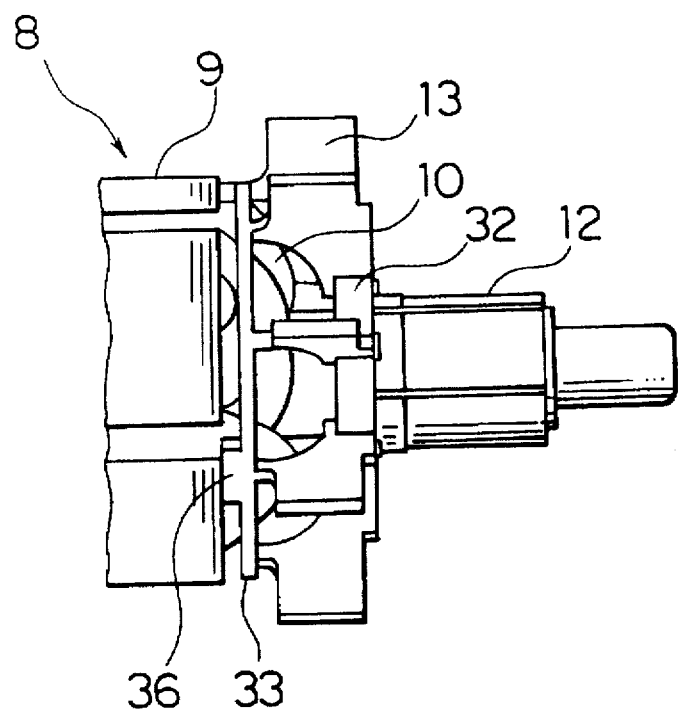
FIGS. 15A and 15B are a front view and a right-hand side view showing a 5-pole rotor on which a cooling fan embodying this invention is mounted.
Figure 15B:
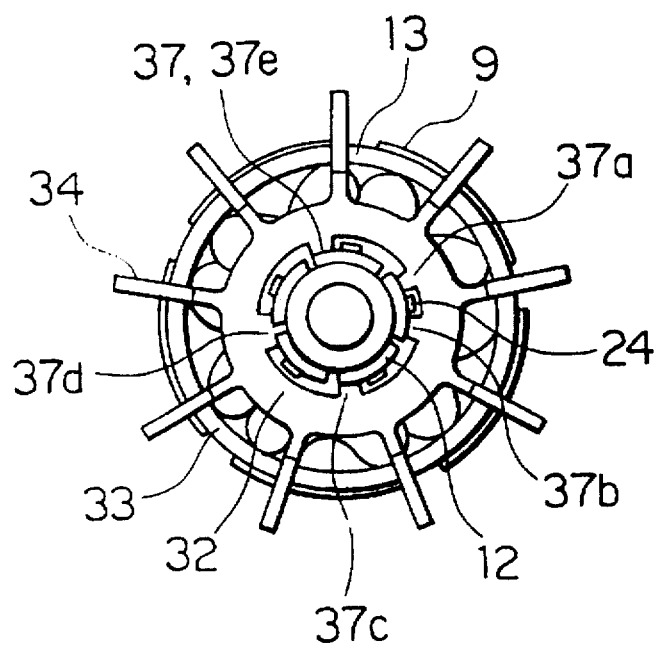

FIGS. 15A and 15B are a front view and a right-hand side view of a 5-pole rotor 8 having a cooling fan 13 embodying this invention. Like parts are indicated by like numerals in FIGS. 13 and 14. In FIGS. 15A and 15B, the cooling fan 13 is positioned in the axial direction without interfering with the coil 10 corresponding to the dimension $L_2$ that is larger than the dimension $L_1$ in FIG. 8A since the end face of the boss 36 provided on the second fan ring 33 comes in contact with the end face of the armature iron core 9. The arrangement of the projections 37a–37e provided on the first fan ring 32 is similar to that shown in FIGS. 13 and 14.

Figure 10A:
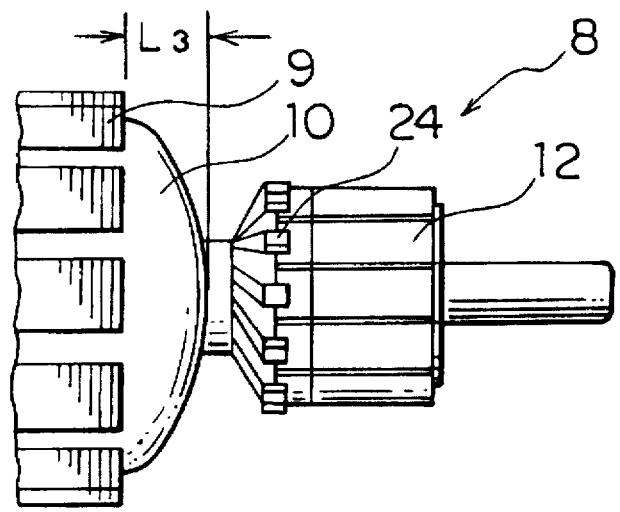
FIGS. 10A and 10B are a front view and a right-hand side view showing an example of a prior-art 12-pole rotor.
Figure 10B:
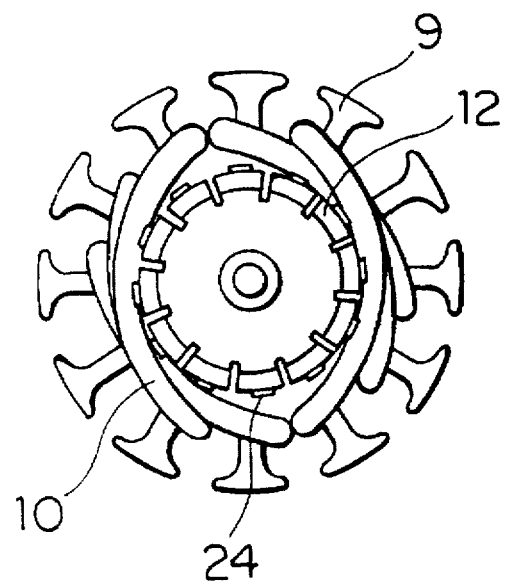
Figure 16A:
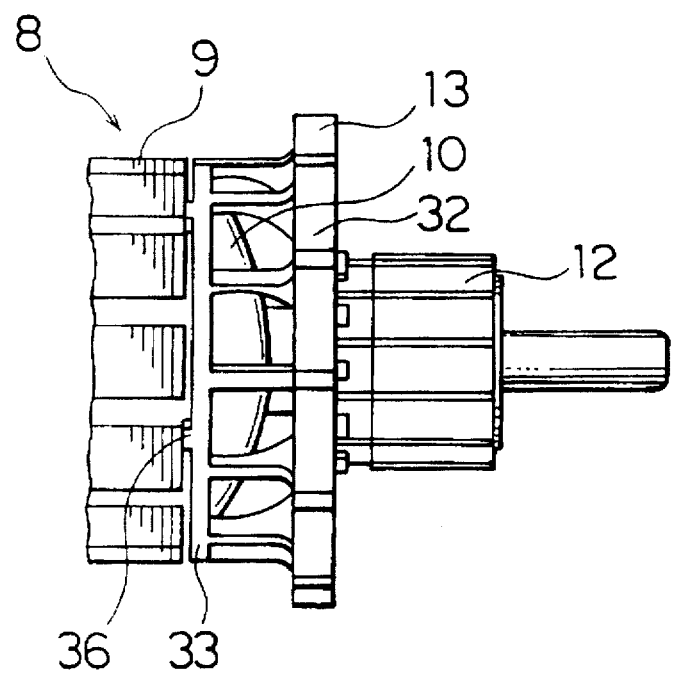
FIGS. 16A and 16B are a front view and a right-hand side view showing a 12-pole rotor on which a cooling fan embodying this invention is mounted.
Figure 16B:
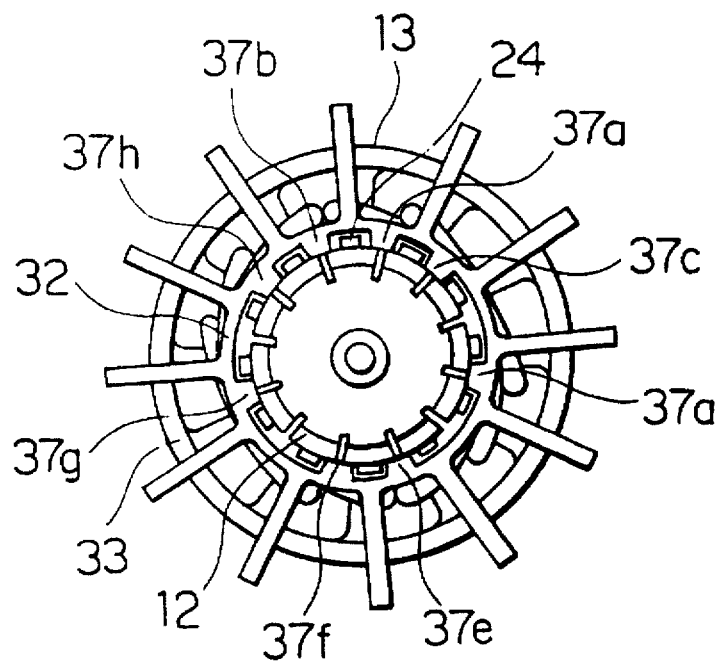

FIGS. 16A and 16B are a front view and a right-hand side view of a 12-pole rotor 8 having a cooling fan 13 embodying this invention. Like parts are indicated by like numerals in FIGS. 13 and 14. In FIGS. 16A and 16B, the cooling fan 13 is positioned in the axial direction without interfering with a coil corresponding to the dimension $L_3$ (refer to FIG. 10A.) that is larger than the dimensions $L_1$ and $L_2$ in FIGS. 8A and 9A because the end face of the boss provided on the second fan ring 33 comes in contact with the end face of the armature iron core 9. The arrangement of the projections 37a–37h is similar to that shown in FIGS. 13 and 14.

Figure 17A:
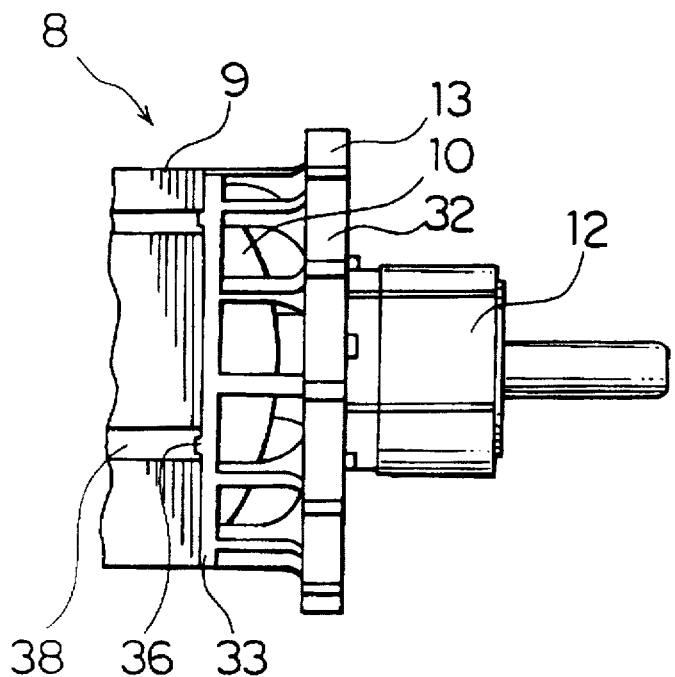
FIGS. 17A and 17B are a front view and a right-hand side view showing another 5-pole rotor on which a cooling fan embodying this invention is mounted.
Figure 17B:
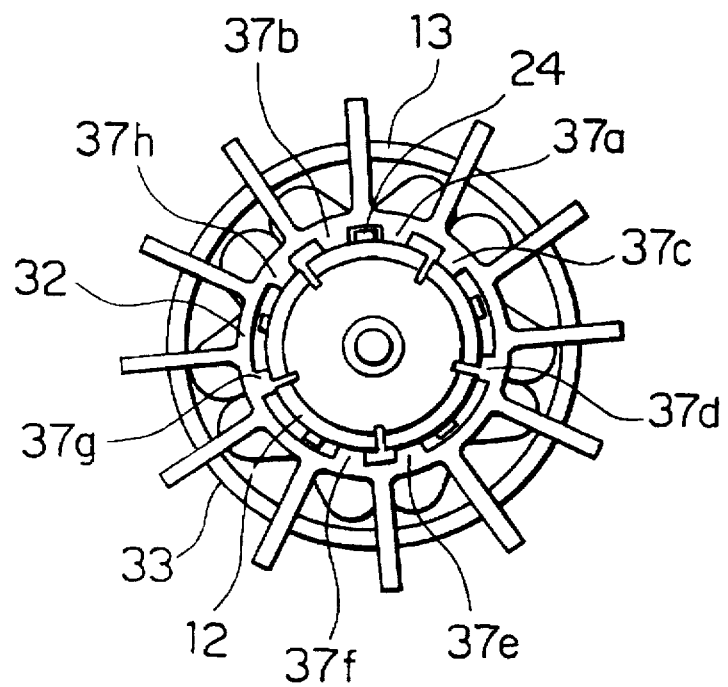

FIGS. 17A and 17B are a front view and a right-hand side view of a 5-pole rotor 8 having a cooling fan 13 embodying this invention. Like parts are indicated by like numerals in FIGS. 16A and 16B. In FIGS. 17A and 17B, the cooling fan 13 is positioned in the axial direction because the boss 36 provided on the second fan ring 33 is inserted into the slot 38 provided on the armature iron core 9 and the end face of the second fan ring 33 comes in contact with the end face of the armature iron core 9. Even in this case, the same cooling fan 13 can be used in common for 5-pole rotor 8 without interfering with the coil 10.

In the case of 3-pole and 12-pole rotors, commutator terminals are disposed at the following angular positions, in terms of central angles;

3-pole rotor: 120°, 240°, 360°

12-pole rotor: 30°, 60°, 90°, 120°, 150°, 180°, 210°, 240°, 270°, 300°, 330°, 360°

Thus, the projections 37 can be disposed to the following angular positions, in terms of central angles:

(1) 0°–30°, (2) 30°–60°, (3) 60°–90°, (4) 90°–120°, (5) 120°–150°, (6) 150°–180°, (7) 180°–210° (8) 210°–240°, (9) 240°–270°, (10) 270°–300°, (11) 300°–330°, (12) 330°–360° When a cooling fan is used in common for rotors of the number of poles of n and integral multiples of n, as in the case of 3-pole and 12-pole rotors, the positioning projections 37 can be provided at positions where the positioning projections 37 do not interfere with commutator terminals equal to the integral multiples of n.

With 5-pole and 12-pole rotors, commutator terminals are disposed at the following angular positions, in terms of central angles:

5-pole rotor: 72°, 144°, 216°, 288°, 360° 12-pole rotor: 30°, 60°, 90°, 120°, 150°, 180°, 210°, 240° 270°, 300°, 330°, 360°

Thus, the projections 37 can be disposed at the following angular positions, in terms of central angles:

(1) 0°–30°, (2) 30°–60°, (3) 60°–72°, (4) 72°–90°, (5) 90°120°, (6) 120°–144°, (7) 144°–150°, (8) 150°–180°, (9) 180°210°, (10) 210°–216°, (11) 216°–240°, (12) 240°–270°, (13) 270°288°, (14) 288°–300°, (15) 300°–330°, (16) 330°–360°

In this case, it is better to set the projections 37 at the locations (1), (2), (5), (8), (9), (12), (15) and (16)by excluding the positions (3), (4), (6), (7), (10), (11), (13) and (14) because of too small central angles, taking into account the width in the circumferential direction of the commutator terminals and the projections 37. By using these positions, the cooling fan 13 can be used in common for 3-pole rotors, too.

This invention having the aforementioned construction and operation as the following effects:

(1) Cooling fans of the same specification can be used in common for rotors having different distances between the end face of the armature iron core and the end face of the coil at the position where the cooling fan is installed, and those having different numbers of poles of the commutator.

(2) The number of molds for molding the cooling fan can therefore be reduced.

(3) Procedures for positioning the cooling fan in the axial and circumferential directions and aligning the cooling fan with the axis of the rotor during assembly can be simplified. This leads to improved productivity.

(4) The number of parts for the cooling fan can be reduced, making inventory control easy.

(5) The cooling effect of the cooling fan can be improved. The increased rigidity of the cooling fan results in less deformation and damage during molding and handling, leading to stabilized and improved motor quality.

What is claimed is:

1. A miniature motor comprising a housing made of a metallic material, formed into a bottomed hollow tubular shape and having a permanent magnet fixedly fitted to the inner circumferential surface thereof, a rotor facing said permanent magnet and comprising an armature iron core having a coil wound thereon and a commutator, an end plate fitted to an open end of said housing and having brushes coming in sliding contact with said commutator and input terminals electrically connected to said brushes, and a cooling fan provided between said armature iron core of said rotor and said commutator; said rotor being rotatably supported by bearings provided on the bottom of said housing and said end plate, characterized in that an integral cooling fan is formed by providing a plurality of fins at circumferentially equal intervals, said plurality of fins being attached between first and second fan rings, said first fan ring being fitted to an end of said commutator, said second fan ring having an end face; and a plurality of bosses are provided on said end face of said second fan ring, said end face of said second ring and said plurality of bosses being fitted to ends of said armature iron core.

2. A miniature motor as set forth in claim 1, wherein:

an outer circumferential surface of said commutator includes a plurality of commutator terminals;

more than three positioning projections are provided on the inner circumferential surface of said first fan ring; two of said positioning projections being disposed on both end sides of any one of said commutator terminals in a circumferential direction of said first fan ring and said commutator, and a remainder of said positioning projections being disposed at any positions of 72°–120°, 144°–216°, and 240°–288°, all central angles of adjoining said projections are less than 180°.

3. A miniature motor as set forth in claim 1, wherein:

an outer circumferential surface of said commutator includes a plurality of commutator terminals;

more than three positioning projections are provided on the inner circumferential surface of said first fan ring; two of said positioning projections being disposed on both end sides of any one of said commutator terminals in a circumferential direction of said first fan ring and said commutator, and a remainder of said positioning projections being disposed at any positions of 30°–60°, 60°–90°, 90°–120°, 120°–150°, 150°–180°, 180°–210°, 210°–240°, 240°–270°, 270°–3000 and 300°–330°, all central angles of adjoining said projections are less than 180°.

4. A miniature motor as set forth in claim 1, wherein:

an outer circumferential surface of said commutator includes a plurality of commutator terminals;

more than three positioning projections are provided on the inner circumferential surface of said first fan ring; two of said positioning projections being disposed on both end sides of any one of said commutator terminals in a circumferential direction of said first fan ring and said commutator, and a remainder of said positioning projections being disposed at any positions of 30°–60°, 90°–120°, 1500°–180°, 180°–210°, 240°–270°, and 300°–330°, all central angles of adjoining said projections are less than 180°.

5. A miniature motor as set forth in claim 1, wherein said bosses are provided in such a manner as to be inserted into slots provided on said armature iron core, and the end face of said second fan ring is contactable with an end face of said armature iron core.

6. A miniature motor as set forth in claim 1, wherein end faces of said bosses are formed in a plane parallel with a plane orthogonally intersecting the axial line of said rotor, and the end faces of said bosses are contactable with an end face of said armature iron core.

7. A fan for mounting on a rotor of an electric motor, the fan comprising:

a first fan ring having first fastening means for connecting to a commutator of the rotor;

a plurality of fins attached to said first fan ring at circumferential intervals;

a second fan ring having second fastening means for connecting to an armature core of the rotor, said second fastening means including an end face on said second fan ring and a plurality of bosses connected to said end face of said second fan ring, one of said end face of said second fan ring and said plurality of bosses being shaped to contact the armature core of first and second types of the rotor, the first and second types of rotors having different numbers of poles.

8. A fan for mounting on a rotor of an electric motor, the fan comprising:

a first fan ring having first fastening means for connecting to a commutator of the rotor, said first fastening means including a plurality of projections connected to said first fan ring and contactable with the commutator, two of said projections being positioned adjacent opposite sides of one of a plurality of commutator terminals on the commutator, a remainder of said projections being angularly positioned around said first fan ring to avoid a remainder of said commutator terminals of first and second types of the rotor, the first and second types of rotors having different numbers of poles;

a plurality of fins attached to said first fan ring at circumferential intervals;

a second fan ring having second fastening means for connecting to an armature core of the rotor.

* * * * *